Feb. 5, 1929.
F. SCHOENBUCHER
VALVE
Filed July 6, 1925
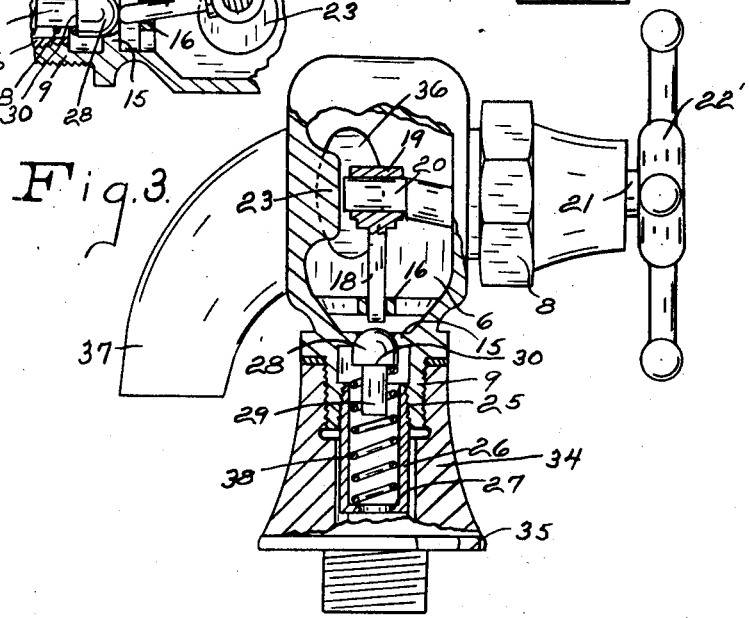
INVENTOR.
Frank Schoenbucher
BY
Erwin, Wheeler & Woolard
ATTORNEYS.

Patented Feb. 5, 1929.

1,701,217

UNITED STATES PATENT OFFICE.

FRANK SCHOENBUCHER, OF MILWAUKEE, WISCONSIN.

VALVE.

Application filed July 6, 1925. Serial No. 41,564.

This invention relates to improvements in valves.

It is the object of the invention to provide a novel and improved valve and novel improved actuating mechanism therefor.

More specifically stated, it is the object of the invention to provide a simplified type of valve lending itself to a construction in which the use of packing is unnecessary and adapted readily to be ground to an accurate seat to which it will automatically adjust itself upon closing.

In the drawings:

Figure 1 is a side elevation of a faucet embodying my improved valve mechanism much of the faucet being shown in axial section to expose the valve mechanism therein.

Figure 2 is a section taken on line 2—2 of Figure 1 showing the parts as they appear when the valve is partially opened.

Figure 3 is a view partially in side elevation and partially in vertical axial section showing a different type of faucet incorporating a valve made in accordance with this invention.

Like parts are identified by the same reference characters throughout the several views.

In the faucet shown in Figures 1 and 2 there is provided the usual delivery spout 5, chambers 6 and packing gland 7 including interiorly a bearing communicating with chamber 6 and provided exteriorly with a packing nut 8. The entire faucet is adapted to be supported in the usual manner by an integrally formed threaded sleeve 9 adjacent to which is an annular stop collar 10.

A transverse web 15 between sleeve 9 and chambers 6 is centrally apertured to provide a valve seat which is preferably concavely ground to conform to the surface of a sphere. Immediately adjacent the valve seat is guide member 16 which is centrally positioned to permit the flow of liquid to occur on either side thereof and is apertured to receive and slidably to fulcrum a valve actuating push rod 18. Push rod 18 is made fast to a bearing sleeve or eccentric strap 19 which encircles the eccentric portion 20 of the actuating shaft 21 to which the handle 22 is fixed. Shaft 21 extends through the packing gland 7 and packing nut 8 in the ordinary manner. A boss 23 may be provided in the lower part of the chamber 6 of the faucet to ensure against the possibility that sleeve 19 might slip downwardly from the eccentric portion 20 of the handle shaft. Boss 23 will not ordinarily be necessary, however.

The sleeve 19 whereby the faucet is threaded to water supply connections in the usual manner is internally threaded at 25 in accordance with this invention and a tube 26 is threadedly engaged interiorly therewith. The end of this tube is formed to direct a comparatively narrow inwardly directed radial flange 27 which may conveniently be made by spinning or otherwise upsetting the material of the tube. This flange provides a seat for the compression spring 38 which fits closely within the tube.

The valve which seats in web 15 comprises a spherically surfaced plug 28 having a stem 29 loosely guided within spring 38 and preferably of reduced diameter whereby the shoulder 30 forms a seat for the upset end of compression spring 38. Thus the spring 38 operates to impel the valve plug 28 to its complementary seat in web 15 whereby to close the port through said web and prevent the passage of fluid through the faucet. If, however, the handle is rotated from the position in which it is shown in Figure 1, the actuating rod 18 will be swung laterally and rearwardly and will pivot slidably in the opening in guide member 16. Thereupon the end of rod 18 will be caused to strike the valve plug 28 near its axis and will impel the plug rearwardly toward its open position. Figure 2 shows the parts as they appear when the plug is partially open, the eccentric portion 20 of the handle shaft being rotated approximately 90 degrees from its original position in which it is shown in Figure 1.

It is particularly to be noted that the actuating rod 18 is wholly free of the valve when the handle is turned to its off position as shown in Figure 1 This leaves the valve free to find its own seat in web 15 and due to the fact that the valve and web have complementary spherical surfaces, it will be obvious that an accurate seat may be obtained without excessive pressure being required from spring 38. It is further to be noted that the valve will operate with equal effectiveness irrespective of the direction in which handle 28 is rotated from its off position. As viewed in Figure 2, the handle has been rotated counter-clockwise. It will be obvious that had the handle been rotated clockwise, the only result would be to reverse the angularity of actuating rod 18 and the valve would, nevertheless, have opened to the same degree for corresponding rotation of the handle.

It is desirable to minimize the lateral thrust of the free end of actuating rod 18 and for this reason the guide member 16 is located closely adjacent the valve seat. The proper relative position of the parts which is illustrated in the accompanying drawings is recommended since the free end of the push rod does not have an excessive thrust and still the guide member 16 is sufficiently remote from web member 16 so that the flow of fluid through the faucet is not tangibly impeded. In fact I have found that a faucet constructed in accordance with the disclosure herein permits a greater flow of liquid than the average faucet which is equipped with an ordinary rubber gasket valve.

When this faucet is in use the tubular spring guide member 26 will be received in the supply pipe to which the faucet is threadedly connected. Nevertheless, it will be obvious that upon the removal of the faucet, tube 26 will be exposed and may be unscrewed to permit immediate access to the valve plug without any necessity for disassembling the handle and valve actuating mechanism. It is one of the advantages of the present invention that the valve plug is free from its actuating mechanism and consequently may not only be readily removed for any purpose whatsoever, but may also oscillate slidably in any direction upon its spherical bearing surface to find a proper and accurate seat in web 15.

I have found in using a valve of this type that the plug 28 will seat so tightly as to enable the use of such a valve to control the flow of gases. It is noteworthy also that its resistance to the flow of any fluid does not vary materially as does the resistance of a rubber gasket valve after use has expanded the gasket.

It is not even necessary to remove the valve plug in order to regrind it to its seat. The valve stem 29 may be provided at its end with a transverse notch 32 adapted to be engaged by a screw-driver introduced through the end of the sleeve and within spring 38. A few turns of the screw-driver on the valve will rapidly grind the valve to its seat.

In Figure 3 I have shown a somewhat different type of faucet equipped with valve mechanism embodying this invention. This type of faucet is particularly adapted for use on lavatories and the like. In place of the ordinary lever handle such as is shown in Figure 1 at 22, the device illustrated in Figure 3 is provided with a handle in the form of a wheel 22'. In Figure 3 the threaded inlet sleeve 9 of the valve is shown operatively engaged in the fitting 34 which is provided with a shoulder at 35 adapted to abut the surface of the lavatory and which, for the purpose of the present disclosure, may be said to comprise a part of the water supply connections to the faucet. The manner in which the tubular spring guiding and seating member 26 is received within the fitting 34 will be noted. The valve mechanism in the faucet shown in Figure 3 corresponds throughout with that already described. The outlet from chamber 6, however, is different from that shown in Figure 1, discharge being effected laterally through a part 36 which communicates with a spigot 37 angularly disposed with reference to the body of the faucet.

It will be obvious that my improved valve mechanism can be mounted in any type of commercial faucet and that its construction is such as to have the advantages and side purposes herein set forth. By the word faucet as used herein I refer generically to any fitting or valve casing within which a valve may seat.

I claim.

1. In a device of the character described, the combination with a faucet provided with a port, of a valve plug adapted to seat in said port, a guide member near said port, an eccentric within said faucet, a thrust rod operatively connected with said eccentric and slidably fulcrumed with reference to said guide member and adapted upon the oscillation of said eccentric to abut said plug and to thrust it from its seat, said rod being operatively connected with the eccentric by means of an eccentric strap.

2. The combination with a faucet provided with a valve port having a valve seat and a manually rotatable handle projecting transversely into said faucet and provided therein with an eccentric portion, of a valve plug having a spherically rounded surface fitting to said seat, a spring urging said plug to said seat, a transverse guide member adjacent said seat apertured to provide a sliding fulcrum for a valve actuating rod, and a thrust rod provided with an eccentric strap engaging the eccentric portion of said handle and projecting through the aperture of said guide member to a position adjacent the surface of said plug whereby to be adapted upon the oscillation of said handle to swing laterally and rearwardly into engagement with said plug and to thrust it from its seat.

FRANK SCHOENBUCHER.